United States Patent [19]
Kondo

[11] Patent Number: 5,289,274
[45] Date of Patent: Feb. 22, 1994

[54] ELECTRONIC IMAGE STABILIZATION APPARATUS

[75] Inventor: Tetsujiro Kondo, Tokyo, Japan
[73] Assignee: Sony Corporation, Japan
[21] Appl. No.: 828,692
[22] Filed: Jan. 31, 1992
[30] Foreign Application Priority Data
   Feb. 6, 1991 [JP] Japan .................. 3-036727
[51] Int. Cl.⁵ .......................... H04N 5/232
[52] U.S. Cl. .................... 348/208; 348/416; 348/420; 348/699
[58] Field of Search .............. 358/105, 222, 160, 209; 354/430; H04N 5/232

[56] References Cited
   U.S. PATENT DOCUMENTS
   4,862,277  8/1989  Iwaibana .................. 358/222
   4,959,725  9/1990  Mandle ................. 358/105 X
   5,012,270  4/1991  Sekine et al. ........... 358/222 X FOREIGN PATENT DOCUMENTS
   0332169  9/1989  European Pat. Off. .
   0348207 12/1989  European Pat. Off. .
   0389192  9/1990  European Pat. Off. .
   0393823 10/1990  European Pat. Off. .

*Primary Examiner*—Mark R. Powell
*Attorney, Agent, or Firm*—Ronald P. Kananen

[57] ABSTRACT

A video signal processing apparatus includes circuitry which generates a motion vector which represents the amount and direction of motion which occurs between consecutive frames of a video signal and for determining if the vector indicates that an image sensing device is undergoing undesirable motion. The circuitry is further arranged to produce a correction signal based on the motion vector and delay the video signal in accordance with the same. A memory is provided in which video information relating to a peripheral portion of the effective picture area of the image sensing device, is stored and operatively connected with a selector which selects one of the delayed video signal and peripheral portion data stored in the memory in accordance with the correction signal.

4 Claims, 3 Drawing Sheets

Fig. 2
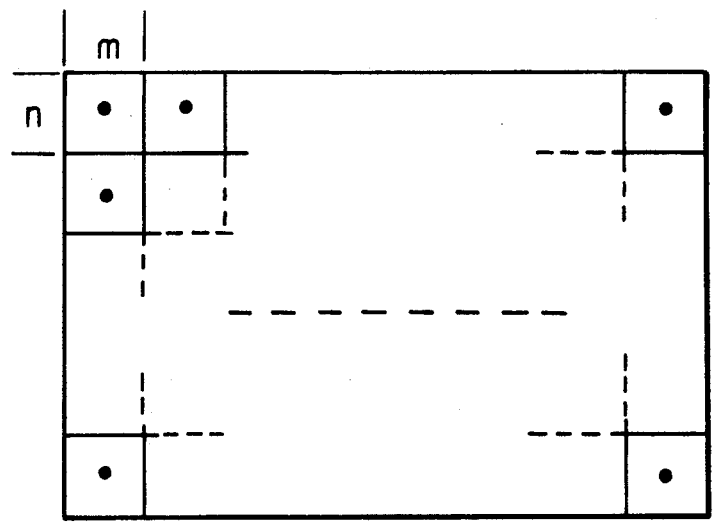
Fig. 3
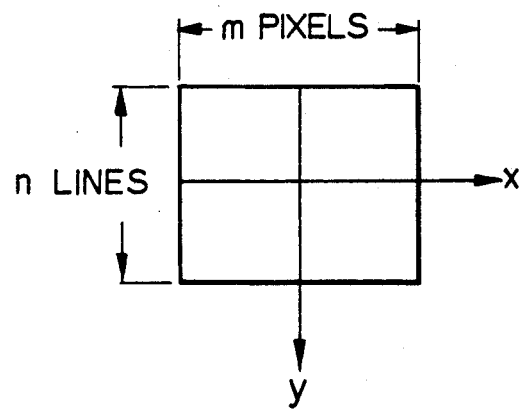
Fig. 4
| a | b | c |
|---|---|---|
| d | x | e |
| f | g | h |

ELECTRONIC IMAGE STABILIZATION APPARATUS

BACKGROUND OF THE INVENTION

1. Field of the Invention

The invention relates to a video signal processing apparatus applicable to a manually induced vibration correction device for video data such as an output produced by a hand-held type video camera.

2. Description of the Prior Art

When a picture is taken using a portable hand-held or so called "handy" type video camera, there is a problem that the reproduced picture jumps about or vibrates due to vibration caused by manual manipulation of the device. To solve this problem, a technique where a motion vector is detected and video data stored in a picture memory is then corrected based on this motion vector, has been proposed (for example, Japanese Patent Disclosure Sho 63-166370). The detection of the motion vector is achieved using block matching, for instance. With this technique, a picture is divided into many areas (called "blocks"), an absolute value of a frame difference between a representative point of a previous frame lying at a central portion of each block and picture element data within a block of the present frame is calculated, an absolute value of a frame difference is accumulated with respect to one picture, and the motion vector is detected from the position of a minimum value of accumulated frame difference data. Also, as described in this publication, picture enlargement to the extent of 15%, for example, is carried out by read-out control of the picture memory, interpolation circuit is used to prevent video data from being lost when the motion correction is made. For such a manually induced vibration correction device, accurate detection of the manually induced vibration is required.

Enlargement of a picture is executed by a process which delays the read-out speed of a picture memory as compared with its write-in speed and which interpolates deficient picture element data. The picture enlargement consequently causes deterioration such as blurring as compared with the original picture.

OBJECTS AND SUMMARY OF THE INVENTION

It is, therefore, an object of the invention to provide a manually induced vibration correction device for video data which eliminates the need for picture enlargement and which is capable of preventing picture quality deterioration.

According to an aspect of the Present invention there is provided a video signal processing apparatus for processing a video signal generated by an image sensing device in a video camera comprising:

a circuit for generating a motion vector representing the amount and the direction of the motion which occurs between consecutive frames of the video signal, a circuit for determining whether the motion vector represents an undesired motion of the image sensing device or not, a correction signal generating circuit for generating a correction signal according to the motion vector, a delay circuit for delaying the video signal in response to the correction signal, a memory circuit for storing a video information corresponding to a peripheral portion of an effective picture area of the image sensing device, and a selector for selecting one of the outputs of the memory and the delay, and for causing a corrected video signal to be generated on the basis of the selection.

The above, and other, objects, features and advantages of the present invention will become readily apparent from the following detailed description thereof which is to be read in connection with the accompanying drawings.

BRIEF DESCRIPTION OF THE DRAWINGS

FIG. 2 is a schematic diagram showing a block division which is used with the present invention;

FIG. 3 is a schematic diagram showing a motion vector search range used in the embodiment of this invention;

FIG. 4 is a schematic diagram depicting the formation of a frequency distribution table which is used in accordance with of this invention;

DETAILED DESCRIPTION OF THE PREFERRED EMBODIMENTS

Figure 1:
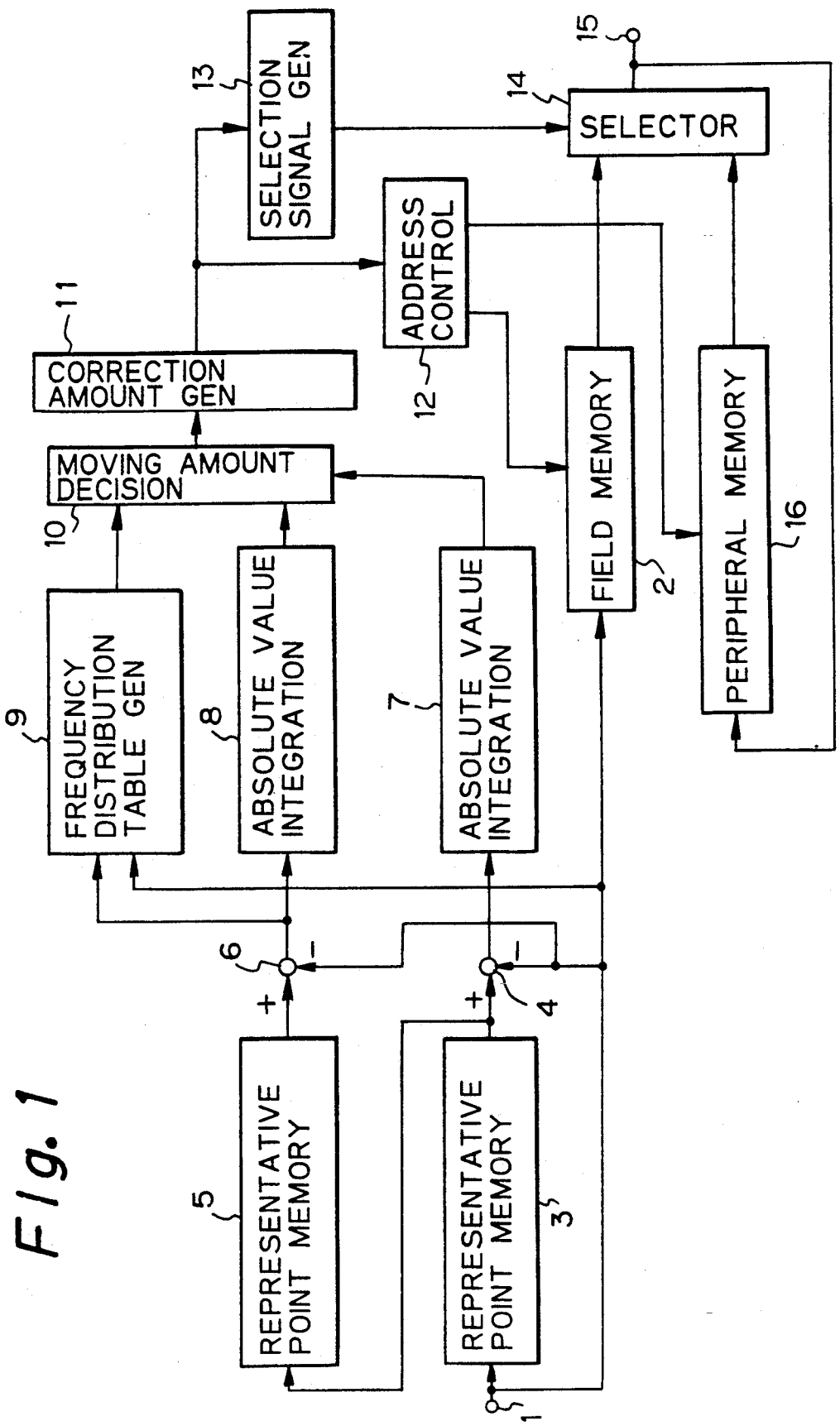
FIG. 1 is a block diagram showing an embodiment of the present invention.

Hereunder, an embodiment of this invention will be described with reference to the drawings. In this embodiment, it should be noted that manually induced vibration results in a movement of a video camera, and the movement of the picture as a whole. However, while the movement of an object means that a certain portion of a picture moves, there is a still portion in the picture, which is the same and this allows distinction between the two to be performed. In FIG. 1, 1 is an input terminal for digital video data. The video data is not limited to that produced by a CCD of the video camera, for example, but can also include a sequence of the order of interlaced scanning.

The input video data is supplied to a field memory 2 and a representative point memory 3. Data which has been subjected to correction for manually induced vibration by a correction signal (described later) is read out at an output of the field memory 2. When the processing is done on a frame by frame basis, a frame memory is used in place of the field memory 2. The output of the representative point memory 3 is supplied to a subtracter 4 and a representative point memory 5. The output of the representative point memory 5 is supplied a subtracter 6. The input video data is supplied to the subtracters 4 and 6. The representative point memory 3 stores data of the representative points of the previous field, while the representative point memory 5 stores data of the representative points two fields before (i.e., one frame).

As shown in FIG. 2, a picture of one field is segmented into blocks of m picture elements × n lines, and a central picture element of each block is taken as a representative point. The representative points are distributed evenly over the picture. The subtractor 4 detects respective differences (that is, inter-field differences) between respective data of m × n picture elements of a certain block in the present field and data of a representative point of a block at the same position in a previous field. The inter-field difference is supplied to an absolute value integration circuit 7. Similarly, the subtracter 6 detects a frame difference between a block of the present field and a representative point lying before two fields. The frame difference is fed to an absolute value integration circuit 8 and a frequency distribution table generator 9.

The detection of a motion vector is made using the frame difference at the absolute value integration circuit 8. The inter-field movement provided by the absolute value integration circuit 7 from the inter-field difference is used as an auxiliary means. Specifically, there is a feature that the inter-field difference provides good accuracy in terms of time but poor accuracy in terms of position, while the inter-frame difference provides poor accuracy in terms of time but good accuracy in terms of position. As a result, when a motion vector is detected from the frame difference, detection accuracy can be improved using the inter-field difference in combination.

As shown in FIG. 3, the search area of movement is handled in the same manner as the block size. $m \times n$ differences between a representative point lying before two fields and picture element data within a block of the present field are produced at the subtracter 6 for each block. In the absolute value integration circuit 8, the absolute value of a frame difference of each position within the block is accumulated over one frame period, distribution of accumulated frame difference data of $m \times n$ is formed, and a minimum value in the distribution is detected as a motion vector. The detection of the motion vector is carried out in the conventional manner.

A frame difference from the subtracter 6 and the input video data are supplied to the frequency distribution table generator 9. In the frequency distribution table generator 9, as shown in FIG. 4, a memory having addresses corresponding to eight Peripheral picture elements a, b, c, d, e, f, g, and h of a picture element x, which coincides with the center of the block of FIG. 3, is provided. Among these picture elements, the frequency of positions (addresses of the memory) having an inclination in terms of space, is updated each time the frame difference becomes zero. For example, when the frame difference is almost zero and when an absolute value of a difference between a value of the picture element x and a value of the picture element d is greater than a threshold value, the address of the memory corresponding to the position of d is brought to $+1$. This processing for each block is accumulated over the whole picture to provide a frequency distribution table. When the inclination in terms of space lies in the horizontal direction (between the picture element x and the picture element e or between the picture element x and the picture element d), for example, a frame difference occurs without fail as a result of horizontal movement. Consequently, when the above-mentioned conditions are met, it means that its block is not moving that direction.

A moving vector detected at the absolute value integration circuit 8 and the output of the frequency distribution table generator 9 are supplied to a motion amount decision circuit 10. The motion amount decision circuit 10 verifies whether the motion vector can be employed as a manually induced vibration vector. Specifically, it decides that the motion vector is generated from the movement of the whole picture when the frequency of positions corresponding to the moving picture, that is, the portion of still blocks, is less than a threshold value for decision. Simultaneously, it decides that the moving vector is a manually induced vector. Otherwise, it decides that there are many stationary blocks in the picture and that the motion vector is generated by the movement of an object in the picture. For example, when thus detected motion vector is in the upward or vertical direction, the frequency of the position of the picture element b is examined. If this frequency is larger than a threshold level, it is understood that there are many stationary portions in the picture and that the motion vector is not a manually induced vibration vector.

The supply of the inter-field moving vector from the absolute value integration circuit 7 to the moving amount decision circuit 10 is to check the stability of a detected moving vector and to improve the accuracy. The output (manually induced vibration vector) of the moving amount decision circuit 10 is supplied to a correction amount generator 11. The manually induced vector is detected from the inter-frame movement but is not the same as the correction amount for hand-caused vibration. For instance, when manually induced vibration in the same direction takes place over three consecutive frame periods, a manually induced vibration vector $V1$ between the first and next frames is detected, and a manually induced vibration vector $V2$ between the second and third frames is detected. Although a correction amount for the second frame may be $V1$, a correction amount for the third frame must be $(V1+V2)$. The correction amount generator 11 generates a correction amount provided by the integration of the manually induced vector. Further, as in this embodiment, when manually induced vibration correction is made at the unit of field, a motion vector is brought to $\frac{1}{2}$ to correspond to the time difference of the field and frame for the conversion of an inter-frame motion amount into an inter-field one.

A manually induced vibration correction signal from the correction amount generator 11 is supplied to an address control circuit 12 and a selection signal generator 13. The address control circuit 12 generates address signals for the field memory 2 and a peripheral memory 16. A picture of one field is written into the field memory 2, and its read-out address is controlled depending on a correction amount. Therefore, video data provided by moving the input video data of one field depending on the correction amount is obtained from the field memory 2. The output of the field memory 2 is supplied to a selector 14. The output of the selector 14 appears on at an output terminal 15 and is also supplied to a peripheral memory 16. Peripheral data which is the output of the peripheral memory 16 is supplied to the selector 14. The selector 14 selects video data, which has been subjected to the correction of manually induced vibration, from the field memory 2 and peripheral data stored in the peripheral memory 16 in response to a selection signal from the selection signal generator 13.

Figure 5A:
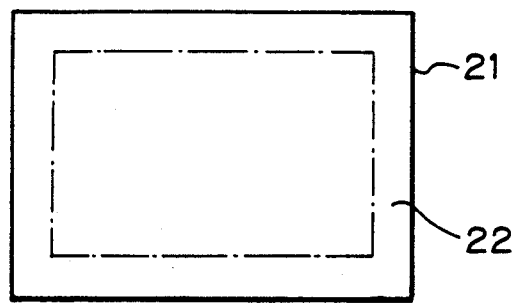
FIGS. 5A and 5B are schematic diagrams showing the correction of manually induced vibration in accordance with this invention.
Figure 5B:
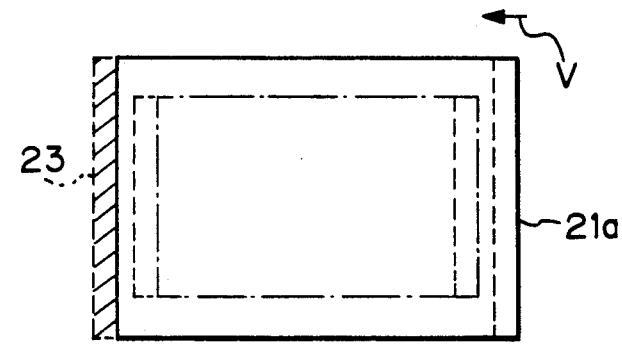

As shown in FIG. 5, a peripheral portion 22 (area outside of a one-dot and dash line) of one field picture (its picture frame is indicated at 21) taken into the field memory 2 is stored in the peripheral memory 16. The width of the peripheral portion 22 is set in consideration of the range of correction of manually induced vibration, for instance, set at the width of the extent of 10 to 20 percent. In FIG. 5B, when a picture which should lie in a position of FIG. 5A, moves due to manually induced vibration in the right-handed direction with respect to the drawing, for example, as shown by the picture frame 21, the whole picture is corrected to a position indicated at a broken line by the manually induced vibration correction amount. In such a case, because of its absence in an initially taken picture, a picture portion 23 indicated by the hatching on the left-hand side of the moved picture is excluded. The excluded portion 23 is replaced by a picture at a corresponding position stored in the peripheral memory 16. This replacement is carried out by the address control of the address control circuit 12 and the switching operation of the selection 14. Also, peripheral picture data other than the dropped portion 23 in the taken video data is written into the peripheral memory 16 to update the content of the memory 16.

In this invention, the correction of hand-manually induced vibration of the output of a video camera may be carried out on a real-time basis. Further, such correction of the manually induced vibration may be applied to the output of a VTR. In correcting the output of the video camera on a real-time basis, it is desirable to display a marker indicative of the presence of manually induced vibration on a picture of a view finder.

Figure 6A:
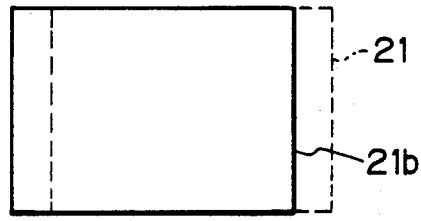
FIGS. 6A and 6B are a schematic diagrams depicting the display of the manually induced vibration as it appears in the view finder of a video camera.
Figure 6B:
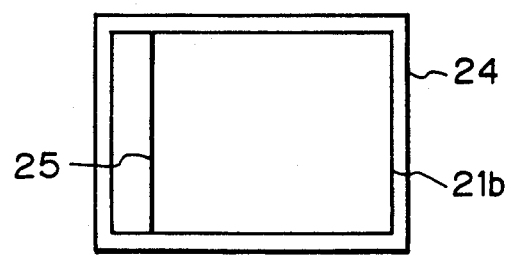

As shown in FIG. 6A, a picture frame indicated by a broken line is the picture actually taken and it is assumed that this picture has been corrected by the above manually induced vibration correction as shown at a picture 21b indicated by a solid line. In this case, as shown in FIG. 6B, a marker 25 indicated by a vertically extending line is displayed at a position corresponding to an edge of the picture frame 21 of the picture which is actually being taken. This marker 25 allows the person who is taking the picture to understand the direction and amount of manually induced vibration or the direction and amount of manually induced vibration correction and allow the corrective movement of the view finder in a direction which corrects the vibration. Since a feedback is performed based on the eyesight of a video camera operator, in addition to the above-mentioned correction of the manually induced vibration, the situation where the range of the manually induced vibration exceeds the correction range, can be prevented beforehand. If the manually induced vibration is not displayed on the view finder, a picture may move abruptly at a certain time point when such a correction cannot be carried out. The marker 25 is not limited to a vertical or longitudinal line and can be an arrow or the like.

Since this invention replaces an excluded portion using data stored in the peripheral memory, no deterioration such as picture blur takes place as compared to picture enlargement. With this invention, discontinuity occurs at a part of the periphery of the picture in terms of time. However, because this is the peripheral portion discontinuity is limited to the periphery of the picture it is not particularly apparent to the eye of the observer.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video signal processing apparatus for processing a video signal generated by an image device in a video camera comprising:

means for generating a motion vector representing a motion amount and a motion direction between consecutive frames of said video signal;

means for judging whether said motion vector represents the undesired motion of said image sensing device or not;

correction signal generating means for generating a correction signal in accordance with said motion vector;

delay means for delaying said video signal in response to said correction signal;

memory means for storing a video information corresponding to a peripheral portion of an effective picture area of said image sensing device; and selection means, responsive to said correction signal, for selecting at least one of the outputs of said memory means and said delay means, and for outputting a video signal.

2. A video signal processing apparatus according to claim 1, wherein said motion vector generating means includes means for storing pixel data representative of each of a plurality of blocks which each have a plurality of pixels, subtracting means for subtracting current corresponding pixel data representative of each of said plurality of blocks from said stored pixel data, and accumulating means for accumulating the outputs of said subtracting means.

3. A video signal processing apparatus according to claim 2, wherein said judging means includes detecting means for detecting the difference between the pixel data representative of each block stored in said storing means and the data representative of the corresponding block in the current frame and distribution table generating means for generating a distribution table in response to the output of said detecting means, said distribution table generating means including a memory having a plurality of address areas corresponding to the pixel of a block.

4. A video signal processing apparatus according to claim 1, wherein said video camera includes a view finder on which a marker corresponding to said correcting signal is displayed.

* * * * *